Jan. 26, 1943. H. S. MILLS ET AL 2,309,132

THERMOSTATIC CONTROL DEVICE

Filed Oct. 27, 1937 2 Sheets-Sheet 1

Inventors
Herbert S. Mills
Leonard P. Traxel

Jan. 26, 1943. H. S. MILLS ET AL 2,309,132
THERMOSTATIC CONTROL DEVICE
Filed Oct. 27, 1937 2 Sheets-Sheet 2
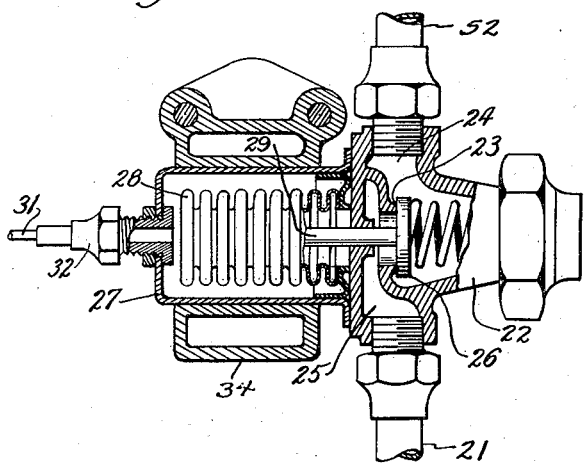
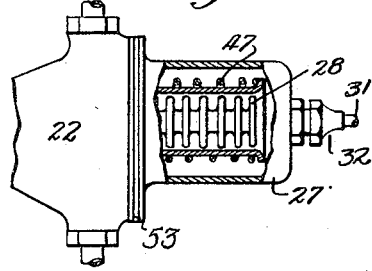
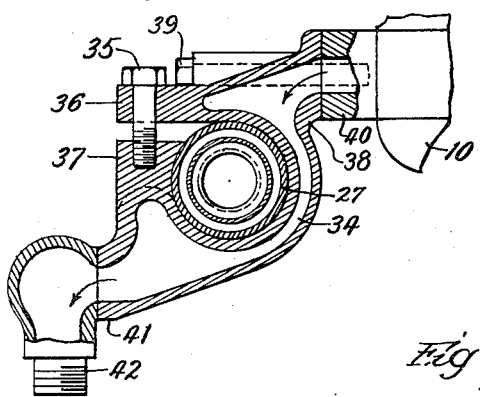
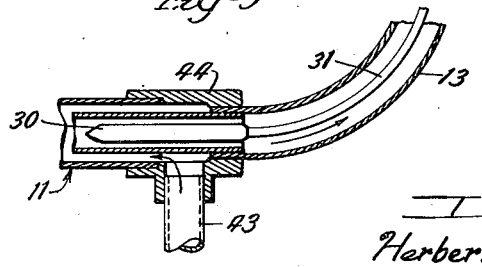
Inventors
Herbert S. Mills
Leonard P. Traxel
By: Carl S. Lloyd
Atty.

Patented Jan. 26, 1943

2,309,132

UNITED STATES PATENT OFFICE 2,309,132

THERMOSTATIC CONTROL DEVICE

Herbert S. Mills, Oak Park, and Leonard P. Traxel, Chicago, Ill., assignor to Mills Novelty Company, Chicago, Ill., a corporation of Illinois Application October 27, 1937, Serial No. 171,260

10 Claims. (Cl. 62—115)

This invention relates to a water regulator for controlling the wasting of cooling water from a cooling system of the type in which the water, after serving its purpose, is allowed to escape into a drain. Such a system is employed in connection with refrigerating mechanism of the compressor-condenser-expander type, and in many of such mechanisms the problem of controlling the waste water becomes a very important one, particularly in places where water is expensive.

The result aimed at in such cases is to automatically control the elimination of water from the system at a temperature which is maximum in relation to its cooling efficiency in the system.

Attempts have been made in the past to provide automatic control for the elimination of water from such a system, by the use of a thermostatically actuated valve in the water line, responsive to temperatures of the compressed refrigerant. But much difficulty has been encountered with devices of this kind, due particularly to failure of the valve to operate efficiently under varying conditions.

The present invention is predicated upon the discovery that the difficulties that have been had with devices of this kind are largely due to fluctuations in the relationship between the operating temperatures of the pressure-responsive bellows of the valve and of the thermostatic bulb which, by the expansion and contraction of the actuating fluid which it contains, actuates the pressure-responsive bellows. In other words, we have found that in a system of this type, the ambient temperature of the bulb may at some times be lower than that of the pressure-responsive bellows and at other times may be higher than that of the bellows. This may be due to variations in the initial temperature of the incoming water, resulting in variations in the temperature to which the water subjects the valve, and, since the bellows forms part of or is directly connected to the valve, there may result a variation in temperature of the bellows for any given temperature of the medium which is being cooled by the water. Widely fluctuating load conditions may also disturb the balance between temperature of the bellows and temperature of the bulb.

We find that where the temperature of the bellows drops below that of the bulb, condensation of the actuating fluid may occur inside of the bellows, and that this is a major factor in the difficulty that has been had with systems of this type.

Where condensation occurs in the bellows, the bulb will lack its normal supply of actuating fluid in liquid form, or may contain no liquid at all. The result will be a serious impairment of the function of the bulb in controlling the bellows. Under such conditions, the bellows, instead of reacting to temperatures of the bulb, will react to its own temperatures. Since the bulb is located in the most efficient position to respond to the temperatures of the compressed refrigerant, it is necessary that the control be kept in the bulb in order that the system may operate efficiently.

Attempts have been made to overcome the difficulties in such a system by providing a bulb of large capacity so that even though some of the actuating fluid might distill over into the bellows, there would still be sufficient fluid left in the bulb to exert control, even though the bellows should become entirely filled with fluid. Even in such a case, the loss of part of the fluid from the bulb will impair its efficiency. More important, however, where the volume of the bulb is thus increased, the sensitivity and quick-acting qualities of the control are seriously impaired.

The present invention therefore aims to provide a thermostatic water valve control utilizing minimum volume of actuating fluid and therefore having maximum speed and sensitivity of action, and yet at the same time being protected against any loss of liquid whatsoever from the bulb.

To this end, the invention contemplates the provision of means for heating the bellows to a temperature which is sufficiently high in relation to the maximum temperature to which the bulb will be subjected in the normal operation of the apparatus, so as to inhibit the formation of condensate in the bellows.

Another object of the invention is to provide an arrangement in which the tendency of the water flowing through the valve to cool off the valve and thereby absorb heat from the bellows, is minimized. If the conduction of heat from the bellows to the valve is rapid enough, the heating effect of the heating means may be counteracted by the cooling effect of the water flowing through the valve; and the invention aims to prevent this condition occurring.

Another object is to provide a highly sensitive and quick-acting thermostatic control of the bulb and bellows type, for use wherever such a control may be employed.

Other objects of the invention will become apparent from the following detailed description of the invention when considered in connection with the accompanying drawings, in which:

Figure 3 is a vertical, transverse, sectional view through the same, taken on the line 3—3 of Figure 2;

Figure 4 is a vertical, longitudinal, sectional view of the same;

Figure 5 is a detailed, sectional view through the portion of the system indicated at 5 in Figure 1; and Figure 6 is a view of a modified form of the invention.

Figure 1:
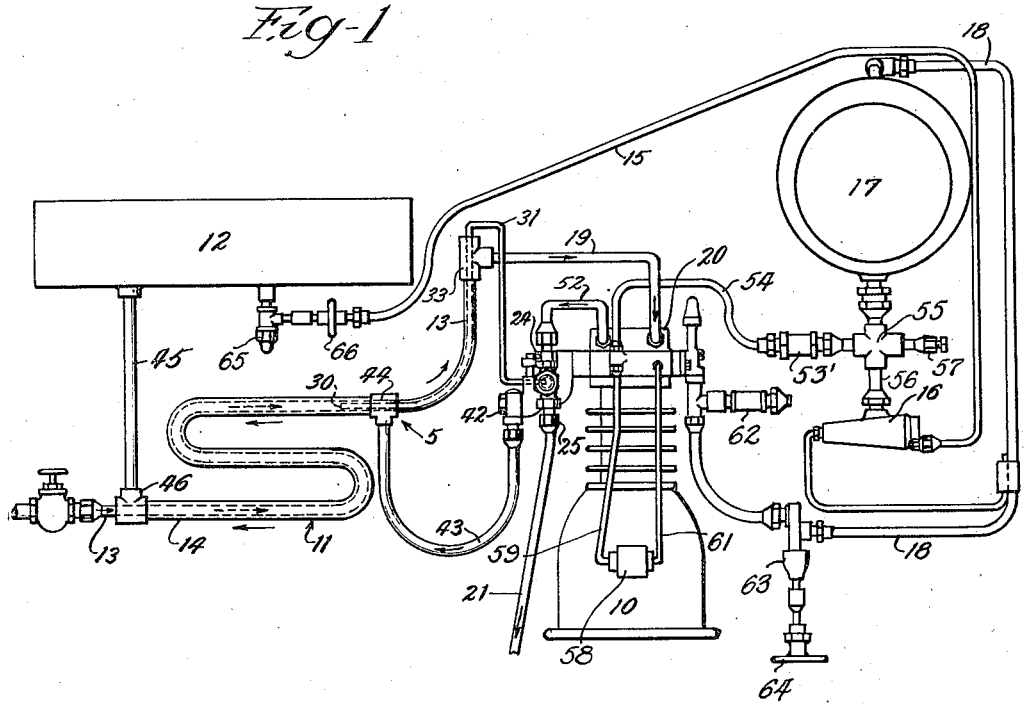
Figure 1 is a schematic view of a refrigerating system embodying the invention.
Figure 2:
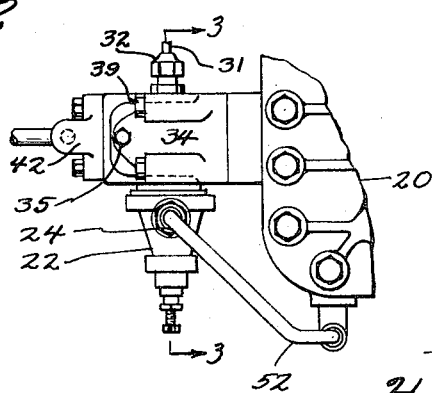
Figure 2 is a plan view of a water valve and associated parts.

Referring first to Figure 1, we have used the reference character 10 to indicate generally the compressor of a refrigerating system in which the refrigerant, after being compressed, is passed through a counter-flow condenser 11, wherein it is cooled and condensed by water flowing through a tube 13 which passes through the refrigerant tube 14 of the condenser 11. From the latter liquid refrigerant passes into a receiver tank 12, thence passes, in liquid form, through a feed tube 15, and through an expansion valve 16 into the evaporator 17, wherein the refrigerating takes place, the evaporated refrigerant returning to the compressor through the return line 18.

A gaseous refrigerant, when being compressed, is considerably heated, and the heat thus developed is partially dissipated into the cooling water after the latter has performed the final cooling operation on the partially cooled refrigerant and thus been raised to an intermediate temperature. To this end, the water inlet pipe 13, after passing through and leaving the condenser tube 14, connects with a tube 19, which leads into a water jacket in the head 20 of the compressor. From the water jacket, the water will be disposed of through a pipe 52, the valve hereinafter described, and a waste-water tube 21.

The present invention employs a water valve including a valve casing 22 formed with a valve seat 23, an inlet 24, an outlet 25, and a valve element 26, which, cooperating with the seat 23, regulates the flow of water from the inlet 24 to the outlet 25.

Attached to the valve casing 22 is a pressure-responsive element including a casing 27 and a bellows 28 mounted within the casing 27. A valve stem 29 connects the bellows 28 to the valve element 26 so that an increase of pressure within the pressure-responsive element will result in the valve element 26 moving away from its seat 23 so as to allow a greater quantity of water to flow from the inlet 24 to the outlet 25.

The bellows 28 is actuated by an actuating fluid contained within a thermostatic bulb 30 (Figure 5) located within the tube 13 in the hot end of the condenser 11. The bulb 30 is connected by means of a hollow wire 31, or tube of minimum capacity, to the pressure-responsive element by means of a fitting 32 attached to the casing 27. The hollow wire 31 enters the tube 13 through one end of a T union 33, the other end of which is attached to the tube 13, and the lateral branch of which is attached to the tube 19. The end of the union through which the wire 31 enters is of course sealed around the wire so as to form a closed passage connecting the tubes 13 and 19.

The means for heating the pressure-responsive element to prevent condensation therein of the actuating fluid, comprises a jacket 34 embracing and clamped to the casing 27 by means of a cap screw 35 extended through an ear 36 formed integrally on one end of the jacket 34 and threaded into a lug 37 formed integrally on the other end of the jacket 34. The jacket 34 has an inlet portion 38, which is secured by means of bolts 39 to the discharge port 40 of the compressor 10, and an outlet portion 41 to which is attached a fitting 42 on one end of a tube 43, the other end of which is connected to the inlet end of the refrigerant tube 14 of the condenser 11 by means of a T union 44. The tube 13 leaves the tube 14 through the opposite end of the T union 44.

The refrigerant is conveyed from the tube 14 to the receiver tank 12 through a tube 45 connected to the tube 14 by means of a T union 46 into one end of which the tube 14 is secured. The tube 13 enters the tube 14 through the other end of the T union 46.

It will now be seen that the hot compressed gases from the compressor 10 are passed through the jacket 34 so as to heat the casing 27 of the pressure-responsive element, prior to being delivered to the condenser 11. Thus the ambient temperature of the pressure-responsive element is higher than the ambient temperature of the thermostatic bulb 30, owing partly to the temperature drop in the compressed refrigerant as it passes through the jacket 34 and the tube 43, and partly to the temperature drop between the refrigerant in the inlet end of the condenser tube 14 and the water within the region of the tube 13 which is enclosed by said inlet end of the tube 14. Thus, irrespective of variations in the actual temperatures, the relationship between the two ambient temperatures of pressure-responsive element and bulb, respectively, will remain the same in at least this respect: that the ambient temperature of the pressure-responsive element will always be higher than that of the bulb.

Thus no matter what the pressure may be within the control system (the bulb, the pressure-responsive element, and the connecting wire 31), the liquid portion of the actuating fluid will be retained in the bulb 30 and the gaseous portion thereof will remain at all times in the pressure-responsive-element end of the system.

The invention makes it possible to employ a very small control bulb, one with only a fraction of the volume formerly found necessary. That is, in prior controls, it has been found necessary to employ a bulb large enough so that even though the connecting line and bellows should completely fill up with actuating fluid in liquid form, the bulb will still contain sufficient liquid to exercise a controlling effect. At the same time, the bulb must be large enough to hold all of the liquid. In order to meet these requirements, the bulb must have a relatively large capacity, one that in any event is larger than that of the bellows.

But such an arrangement is very sluggish compared to that of the present invention, in which the bulb is small and is maintained full or nearly full of liquid at all times.

Because of the uniformly high sensitivity and quick-acting quality of the bulb and bellows arrangement of the present invention, it is applicable to any control arrangement utilizing the bulb and bellows type of construction. For example, a bulb and bellows, the latter heated to a temperature constantly higher than that of the bulb, may be employed in an arrangement wherein the bellows actuates a switch, or the mechanism of a remotely controlled thermometer.

The present invention may utilize the heating of the connecting tube in addition to the bellows, should the volume of the connecting tube be greater than that of the bulb.

Other means of heating the pressure-responsive element may be employed. For example, as shown in Figure 6, an electric heating coil 47, disposed between the casing 27 and the bellows 28, may be connected in a circuit in parallel with that of the compressor motor, so as to be energized whenever the compressor is operating. The coil 47 could also be arranged exteriorly of the casing 27.

Another possible method of heating the pressure-responsive element is to subject it to the heating effect of the cooling water being discharged from the water jacket of the compressor 10. This may be accomplished by jacketing the pressure-responsive element with a water jacket forming part of the waste-water line, and by further arranging for by-passing the water from the water jacket of the compressor through the valve jacket when the compressor starts up, or by any other means of transmitting the temperature of the water in the compressor jacket, to the valve.

As disclosed in Figure 1, the discharge port of the compressor water jacket is connected by means of a pipe 52 to the inlet 24 of the water valve, the waste-water tube 21 being connected as shown to the outlet 25 of the water valve. In the arrangement shown, the heating effect of the waste water assists the heating effect of the compressed gas by eliminating the cooling effect which would be present if the water valve were located, for example, in the inlet side of the water line. We have found that where the latter is the case and where the valve is connected directly to the pressure-responsive element with a metal-to-metal contact, there may be sufficient conduction so that the cold water will, under certain conditions, pull down the temperature of the pressure-responsive element to an undesirably low level in spite of the presence of the heating means. Where the valve is located at the outlet side of the compressor water jacket, however, we find that it functions efficiently under all conditions.

We do not mean to indicate that it is absolutely essential to the objects of the invention that the valve be located at the discharge side of the compressor water jacket. By insulating the valve casing 22 from the casing 27 through the medium of a gasket 53 of heat insulating material, as shown in Figure 6, it is possible to embody the invention in an arrangement wherein the inlet 24 and outlet 25 of the valve are connected in the tube 13 so that the water passes through the valve before entering the compressor, and the invention in its broader aspects contemplates such an arrangement as one of the modifications that comes within its scope.

Additional parts of the refrigeration system shown in the drawings for the sake of completeness are as follows:

A check valve 53' is provided in a tube 54 which extends from the low or evaporator side of the system to the high or condenser side of the system through the compressor 10. Said tube 54 connects with a fitting 55 in a pipe 56 extending between the expansion valve 16 and the evaporator 17, a connection 57 extending laterally from the side of said fitting 55 opposite that to which the tube 54 connects, said connection being for the purpose of connecting additional equipment to the system if desired. The check valve 53' normally prevents passage of the refrigerant from the low to the high side of the system, but when the temperature of the freezer and evaporator 17 is raised, as in washing, to a point above the temperature of the high side, the refrigerant passes through said check valve to the high side of the system, and is thus prevented from escaping.

An electrical switch and safety control device 58 is shown on the side of the compressor 10, this being used in starting and stopping the motor used to drive the compressor. A tube 59 connects the high pressure side of the refrigeration system to said control 58 and functions so that before any pressure develops of such proportions that it would result in damage to the system, the power will be cut off and the compressor stopped. The tube 61 connects the low side of the refrigeration system to said control 58 and causes shutting off of the power when refrigeration is not needed and turning on the power when the pressure conditions indicate refrigeration to be needed. A fitting 62 is provided on the line 18 for the purpose of connecting additional refrigeration equipment if desired, and a valve 63 is provided in said line for turning on and off the refrigeration supply to the evaporator 17, said valve being operated by a hand wheel 64.

A refrigerant shut-off valve 65 is provided in the tube 15 to lock the refrigerant in the receiver tank 12 and associated parts of the system when the freezer equipment is being serviced, a strainer or filter 66 being also located in said tube 15.

The foregoing detailed description has been given for clearness of understanding only, and no unnecessary limitations should be understood therefrom, but the appended claims should be construed as broadly as permissible in view of the prior art.

We claim as our invention:

1. In a cooling system employing water as the cooling medium for a device in which heat is produced in a gas handled by such device, means for regulating the wasting of the cooling water, comprising a valve in the water line of said system, a fluid pressure responsive element for actuating said valve, a thermostatic bulb responsive to temperature changes in said hot gas, said bulb communicating with said element and containing an actuating fluid exerting varying pressures against said element, and means for applying to said element heat from a hotter region of said gas than that acting upon said bulb.

2. In a cooling system employing water as the cooling medium for a device in which heat is produced in a gas handled by such device, means for regulating the wasting of the cooling water, comprising a valve in the water line of said system, a fluid pressure responsive element for actuating said valve, a thermostatic bulb responsive to temperature changes in said hot gas, said bulb communicating with said element and containing an actuating fluid exerting varying pressures against said element, and means for applying to said element sufficient heat from said gas to maintain the temperature of said element at least as high as the maximum temperature of the bulb.

3. In a cooling system employing water as the cooling medium for a device in which heat is produced in a gas handled by such device, means for regulating the wasting of the cooling water, comprising a valve in the water line of said system, a fluid pressure responsive element for actuating said valve, a thermostatic bulb responsive to temperature changes in said hot gas, said bulb communicating with said element and containing an actuating fluid exerting varying pressures against said element, and means for applying to said element heat from said gas so as to inhibit condensation of the actuating fluid in said element, said means comprising a jacket around said element, and means for passing the hot gas through said jacket.

4. In a cooling system employing water as the cooling medium, means for regulating the wasting of the cooling water, comprising a valve controlling the flow of water through the system, a fluid pressure responsive element for actuating said valve, a thermostatic bulb responsive to temperature changes in the medium that is being cooled, said bulb communicating with said element and containing an actuating fluid exerting varying pressures against said element, and means variable in heating effect in accordance with temperature changes in said medium for maintaining the temperature of said element at a higher level than the maximum temperature of said bulb so as to inhibit condensation of the actuating fluid in said element.

5. In a cooling system employing water as the cooling medium, means for regulating the wasting of the cooling water, comprising a valve controlling the flow of water through the system, a fluid pressure responsive element for actuating said valve, a thermostatic bulb responsive to temperature changes in the system, said bulb communicating with said element and containing an actuating fluid exerting varying pressures against said element, and means variable in heating effect in accordance with temperature changes in the system for maintaining the temperature of said element at a level sufficiently high to inhibit condensation of the actuating fluid in said element.

6. In a refrigerating system, a compressor having a water jacket, means for supplying cooling water to said jacket, a valve controlling the flow of said cooling water, a pressure-responsive element controlling said valve, a thermostatic bulb responsive to changes in temperature of the compressed refrigerant, said bulb communicating with said element and containing an actuating fluid exerting varying pressures against said element, and means for applying to said element heat from a hotter region of said refrigerant than that acting upon said bulb.

7. In a refrigerating system, a compressor having a water jacket, an inlet line for supplying cooling water to said jacket, a waste-water line for disposing of said water after it leaves the jacket, a valve controlling the wasting of the water, said valve being located in said waste-water line, a pressure-responsive element controlling said valve, a thermostatic bulb responsive to changes in temperature of the compressed refrigerant, said bulb communicating with said element and containing an actuating fluid exerting varying pressures against said element, and means for maintaining the temperature of said element constantly high enough during operation of the compressor to inhibit condensation of the actuating fluid in said element.

8. In a refrigerating system, a compressor having a water jacket, an inlet line for supplying cooling water to said jacket, a waste-water line for disposing of said water after it leaves the jacket, said valve controlling the wasting of the water, said valve being located in said waste-water line, a pressure-responsive element controlling said valve, a thermostatic bulb responsive to changes in temperature of the compressed refrigerant, said bulb communicating with said element and containing an actuating fluid exerting varying pressures against said element, means for maintaining the temperature of said element high enough to inhibit condensation of the actuating fluid in said element, said means comprising a jacket around said element, and means for conducting the compressed refrigerant through said jacket.

9. In a refrigerating system, a compressor having a water jacket, an inlet line for supplying cooling water to said jacket, a waste-water line for disposing of said water after it leaves the jacket, a valve controlling the wasting of the water, said valve being located in said waste-water line, a thermostatic bulb responsive to changes in temperature of the compressed refrigerant, said bulb communicating with said element and containing an actuating fluid exerting varying pressures against said element, means for maintaining the temperature of said element high enough to inhibit condensation of the actuating fluid in said element, said means comprising a jacket around said element, said jacket communicating directly with the refrigerant exhaust port of said compressor, whereby the hot refrigerant will pass through said jacket and heat said element to a temperature higher than that of the bulb.

10. In a refrigerating system, a compressor having a water jacket, an inlet line for supplying cooling water to said jacket, a waste-water line for disposing of said water after it leaves the jacket, a valve controlling the wasting of the water, said valve being located in said waste-water line, a pressure-responsive element controlling said valve, a thermostatic bulb responsive to changes in temperature of the compressed refrigerant, a fluid tube connecting said bulb to said element to form a closed fluid passage, and means for maintaining at least a portion of that part of said passage comprising the element and tube, at a temperature constantly higher than that of the bulb during operation of the compressor.

HERBERT S. MILLS.
LEONARD P. TRAXEL.